US010591659B2

(12) United States Patent
Fujita et al.

(10) Patent No.: US 10,591,659 B2
(45) Date of Patent: Mar. 17, 2020

(54) LIGHT GUIDE PLATE, DISPLAY DEVICE AND GAME MACHINE

(71) Applicant: OMRON Corporation, Kyoto-shi, Kyoto (JP)

(72) Inventors: Junya Fujita, Ichinomiya (JP); Yoshimasa Osumi, Kyoto (JP); Yoshihiko Takagi, Kyoto (JP); Yuji Hirose, Kyotanabe (JP)

(73) Assignee: OMRON Corporation, Kyoto-shi (JP)

( * ) Notice: Subject to any disclaimer, the term of this patent is extended or adjusted under 35 U.S.C. 154(b) by 6 days.

(21) Appl. No.: 15/529,273

(22) PCT Filed: Oct. 15, 2015

(86) PCT No.: PCT/JP2015/079229
§ 371 (c)(1),
(2) Date: May 24, 2017

(87) PCT Pub. No.: WO2016/103865
PCT Pub. Date: Jun. 30, 2016

(65) Prior Publication Data
US 2017/0285245 A1 Oct. 5, 2017

(30) Foreign Application Priority Data

Dec. 25, 2014 (JP) .................. 2014-263585
Jul. 10, 2015 (JP) .................. 2015-139033

(51) Int. Cl.
*F21V 8/00* (2006.01)
*A63F 7/02* (2006.01)
*G07F 17/34* (2006.01)

(52) U.S. Cl.
CPC ............ *G02B 6/0036* (2013.01); *A63F 7/027* (2013.01); *G02B 6/006* (2013.01); *G07F 17/34* (2013.01)

(58) Field of Classification Search
CPC ....... G02B 6/0036; G02B 6/006; A63F 7/027; G07F 17/34
(Continued)

(56) References Cited

U.S. PATENT DOCUMENTS 6,745,506 B2 * 6/2004 Maas .................. G02B 6/0036
362/604
2002/0043012 A1 4/2002 Shibata et al.
(Continued)

FOREIGN PATENT DOCUMENTS

JP H06-250025 A 9/1994
JP 2002-108257 A 4/2002
(Continued)

*Primary Examiner* — Anh T Mai
*Assistant Examiner* — Jessica M Apenteng
(74) *Attorney, Agent, or Firm* — Metrolex IP Law Group, PLLC

(57) ABSTRACT

A light guide plate, produced from material transparent to visible light, includes a plurality of prisms provided on one surface (a diffusion surface) thereof in a predetermined pattern. The plurality of prisms include a reflection surface that reflects visible light emitted from a light source and entering the light guide plate from an input surface toward another surface (an output surface). Each prism in the plurality of prisms is distributed so that the reflection surfaces of two prisms separated by a predetermined pitch are oriented in the same direction, and the reflections surfaces of two prisms that are closer than the predetermined pitch are oriented in mutually different directions.

8 Claims, 8 Drawing Sheets

(58) Field of Classification Search
USPC .......................................................... 362/606
See application file for complete search history.

(56) References Cited

U.S. PATENT DOCUMENTS

| | | | |
|---|---|---|---|
| 2010/0124076 A1 | 5/2010 | Kurihara et al. | |
| 2011/0210921 A1* | 9/2011 | Lee | G06F 3/0202 |
| | | | 345/170 |
| 2013/0343084 A1 | 12/2013 | Okuda et al. | |

FOREIGN PATENT DOCUMENTS

| | | |
|---|---|---|
| JP | 2009-282414 A | 12/2009 |
| JP | 2010-108795 A | 5/2010 |
| JP | 2012-40243 A | 3/2012 |
| JP | 2012-194291 A | 10/2012 |
| JP | 2014-96320 A | 5/2014 |

* cited by examiner

LIGHT GUIDE PLATE, DISPLAY DEVICE AND GAME MACHINE

FIELD

The present invention relates to a light guide plate and display device that present a pattern. The present invention also relates to a game machine that employs such a display device.

BACKGROUND

Luminaires, i.e., illumination devices may include a panel-like light guide made from optically transmissive material. One such device proposed uses a plurality of prisms formed on the light guide plate to change the orientation of the light entering thereinto from a light source. Thereby the device is capable of broadening the area that can be illuminated (for example, see Patent Document 1).

For instance, Patent Document 1 discloses an illumination device where the rear surface of the light guide plate includes a plurality of optical path changing elements. The optical path changing elements modify the optical path of the light entering the light guide plate, and cause the light to exit from the light guide plate. Each of the optical path changing elements reflect the light entering the light guide to give the light a certain directivity. The plurality of optical path changing elements include a plurality of kinds of optical path changing elements. Light reflected from at least one kind of optical path changing element is oriented in one direction, and light reflected from another kind of optical path changing element is oriented in another different direction.

REFERENCES

Patent Documents

[Patent Document 1] Japanese Unexamined Patent Application Publication No. 2014-96320

SUMMARY

Technical Problem

The illumination device disclosed in Patent Document 1 employs a light guide plate whereon the above plurality of kinds of optical path changing elements is formed. Therefore, the intensity distribution of the light observed changes depending on the viewing direction.

In contrast, an optical ornament that illuminates a particular pattern with little change in the brightness even when the object is viewed from various directions may be more desirable depending on the intended application.

Embodiments of the present invention provide a light guide plate capable of reducing the difference in brightness that results because of the direction from which an illuminated pattern is viewed.

Solution to Problem

One embodiment of the present invention provides for a light guide plate formed from a panel transparent to visible light. The light guide plate includes: an input surface configured to form the sidewall of the light guide plate that faces a light source, the light source configured to emit visible light; and a plurality of prisms arranged along one surface of the light guide plate and distributed in a predetermined pattern, the prisms including a reflection surface that reflects the visible light emitted from the light source and entering the light guide plate from the input surface toward another surface of the light guide plate. Each prism in the plurality of prisms is distributed so that the reflection surfaces of two prisms separated by a predetermined pitch are oriented in the same direction, and the reflections surfaces of two prisms closer than the predetermined pitch are oriented in mutually different directions.

Each prism in the plurality of prisms may be arranged so that the reflection surfaces of two prisms that are closer than the predetermined pitch are oriented in mutually different directions within a plane parallel to said one surface in a predetermined range of angles that includes a direction facing the light source.

The predetermined pitch may be established at less than the minimum distance for distinguishing two prisms out of the plurality of prisms.

Additionally, the light guide plate may further include a metal layer shaped in the predetermined pattern and provided at the location of the predetermined pattern on the surface on which the prisms are formed.

Another embodiment of the present invention provides for a light guide plate formed from a panel transparent to visible light. The light guide plate includes: an input surface configured to form the sidewall of the light guide plate that faces a light source, the light source configured to emit visible light; and a plurality of prisms arranged along one surface of the light guide plate and distributed in a predetermined pattern, the prisms including a reflection surface that reflects the visible light emitted from the light source and entering the light guide plate from the input surface toward another surface of the light guide plate. The predetermined pattern is partitioned into a plurality of sections with each prism in the plurality of prisms arranged so that the reflection surface of the prisms in a section are oriented in the same direction, and the reflection surface of the prisms in two adjacent sections are oriented in mutually different directions.

Additionally, the light guide plate may further include a metal layer shaped in the predetermined pattern and provided at the location of the predetermined pattern on the surface on which the prisms are formed.

Another embodiment of the present invention provides a display device. The display device includes a light source configured to emit visible light, a light guide plate formed from a panel transparent to visible light; and a controller configured to control the turning on and off of the light source.

The light guide plate includes: an input surface configured to face the light source and form one sidewall of the light guide plate; and a plurality of prisms arranged along one surface of the light guide plate and distributed in a predetermined pattern, the prisms including a reflection surface that reflects the visible light emitted from the light source and entering the light guide plate from the input surface toward another surface of the light guide plate. Each prism in the plurality of prisms is distributed so that the reflection surfaces of two prisms separated by a predetermined pitch are oriented in the same direction, and the reflections surfaces of two prisms closer than the predetermined pitch are oriented in mutually different directions.

Another embodiment of the present invention provides a game machine. The game machine includes: a main game unit; a display device provided on the surface of the main game unit facing a player. The display device includes: a light source configured to emit visible light; a light guide plate formed from a panel transparent to visible light; and a controller configured to control the turning on and off of the light source.

The light guide plate includes: an input surface configured to face the light source and form one sidewall of the light guide plate; and a plurality of prisms arranged along one surface of the light guide plate and distributed in a predetermined pattern, the prisms including a reflection surface that reflects the visible light emitted from the light source and entering the light guide plate from the input surface toward another surface of the light guide plate. Each prism in the plurality of prisms is distributed so that the reflection surfaces of two prisms separated by a predetermined pitch are oriented in the same direction, and the reflections surfaces of two prisms closer than the predetermined pitch are oriented in mutually different directions.

Effects

A light guide plate according to embodiments of the invention reduces the difference in brightness that results because of the direction from which an illuminated pattern is viewed.

DETAILED DESCRIPTION

A display device according to embodiments of the present invention is described below with reference to the drawings. The display device includes a light guide plate formed from a panel that is transparent to visible light; one surface of the light guide plate faces the observer and is taken as the output surface. A plurality of prisms are created on the surface of the light guide plate facing the light output surface; light enters the light guide plate from an input surface formed on a sidewall thereof. The plurality of prisms reflects the visible light emitted from the light source and entering the light guide plate from the input surface toward the output surface. The plurality of prisms is distributed to coincide with the pattern shown by the display device. The prisms are distributed so that the reflection surfaces of the prisms separated at a predetermined pitch are identically oriented and the reflection surfaces of prisms closer than the predetermined pitch are oriented in different directions within a predetermined range of angles. This arrangement reduces the differences in brightness that results because of the direction from which the pattern is viewed.

In the description that follows, the side of the light guide panel facing the observer is assumed to be the front surface, and the opposite surface taken as the rear surface.

Figure 1:
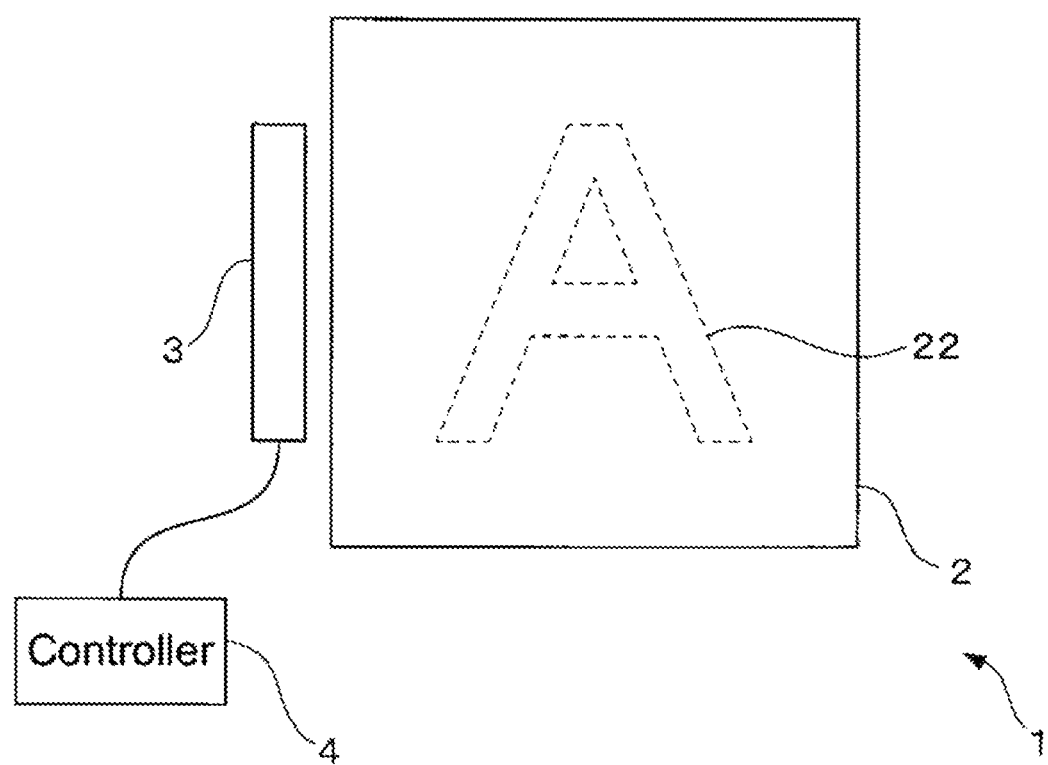
FIG. 1 is a schematic view illustrating a configuration of a display device according to an embodiment.

FIG. 1 is a schematic view illustrating a configuration of a display device according to an embodiment. The display device 1 includes a light guide plate 2, a light source 3, and a controller 4.

The light guide plate 2 is produced from a panel-like material that is transparent with respect to the visible light emitted from the light source 3. For instance, the light guide plate 2 may be molded from an optically transparent resin of poly methyl methacrylate (PMMA), a polycarbonate, or a cycloolefin polymer. The plurality of prisms is created on the rear surface of the light guide plate 2 and distributed corresponding to the light source 3 to produce a predetermined pattern 22. When the light source 3 is lit, the plurality of prisms propagate the light from the light source 3 through the light guide plate 2 and toward the observer located in front of the light guide plate; hereby the emission of the predetermined pattern 22 is visible to the observer.

The specifics of the light guide plate 2 are described later.

The light source 3 includes at least one light emitting element capable of emitting visible light. The light emitting surface of the light emitting element is arranged facing an input surface 2a, which is at least one of the side walls in the light guide plate 2. The controller 4 sends a control signal according to whether to turn the light source 3 on or off. When the controller 4 illuminates the light source 3, the light emitted from the light source 3 enters the light guide plate 2 via the input surface 2a, travels straight or is totally reflected through the light guide plate 2, is reflected at the plurality of prisms formed on the diffusion surface 2b on the rear surface of the light guide plate 2, and then exits from the output surface 2c toward the front surface.

Note that the light emitting element in the light source 3 may be a light emitting diode, an incandescent light, or a fluorescent light.

The controller 4 may include a processor, a memory circuit, and a drive circuit for the light source 3. The controller 4 may turn the light source 3 on or off in response to a signal from a control device (not shown) in a host computer. Finally, the controller 4 turns on the light source 3 to render the pattern 22 visible to an observer in front of the light guide plate 2, and on the other hand, turns off the light source 3 so the observer cannot see the pattern 22.

The specifics of the light guide plate 2 are described below.

Figure 2:
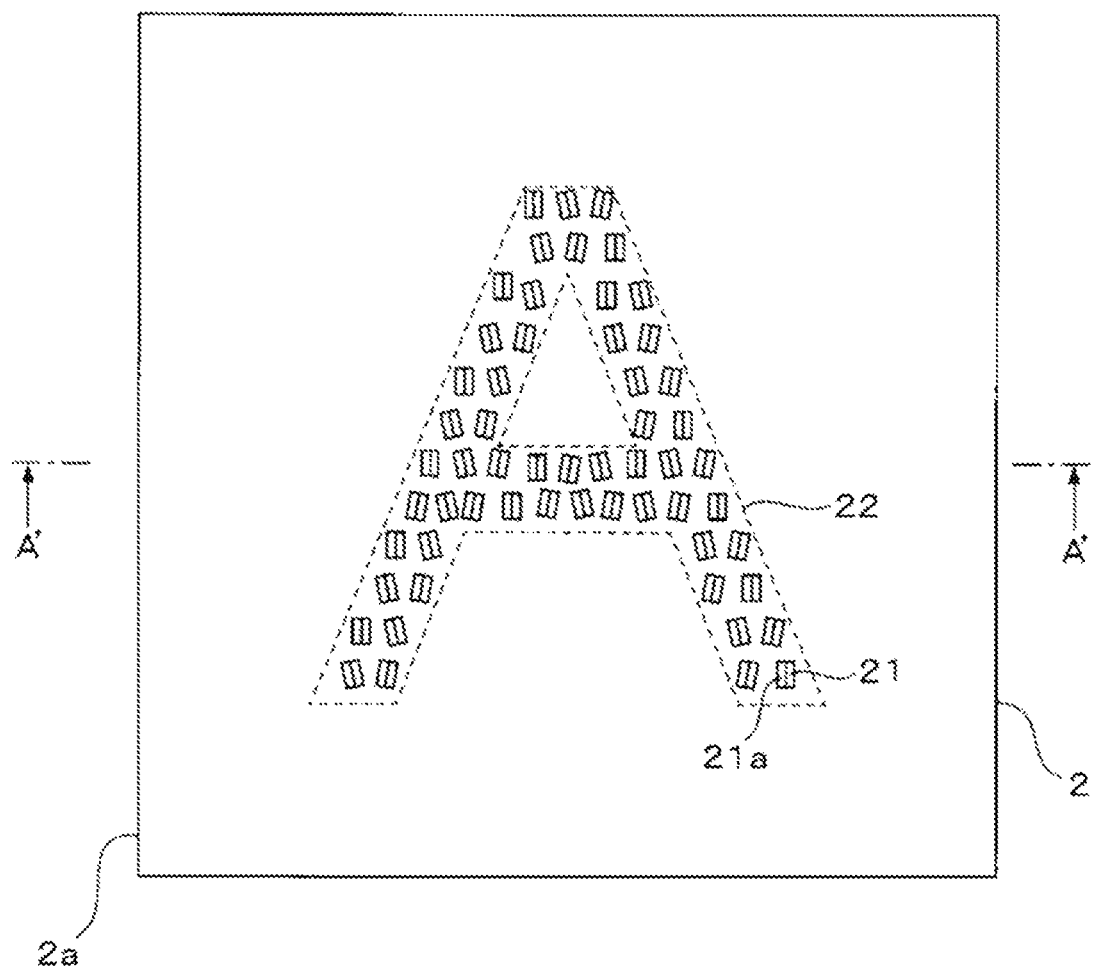
FIG. 2 is a schematic front view of a light guide plate in the display device.
Figure 3:
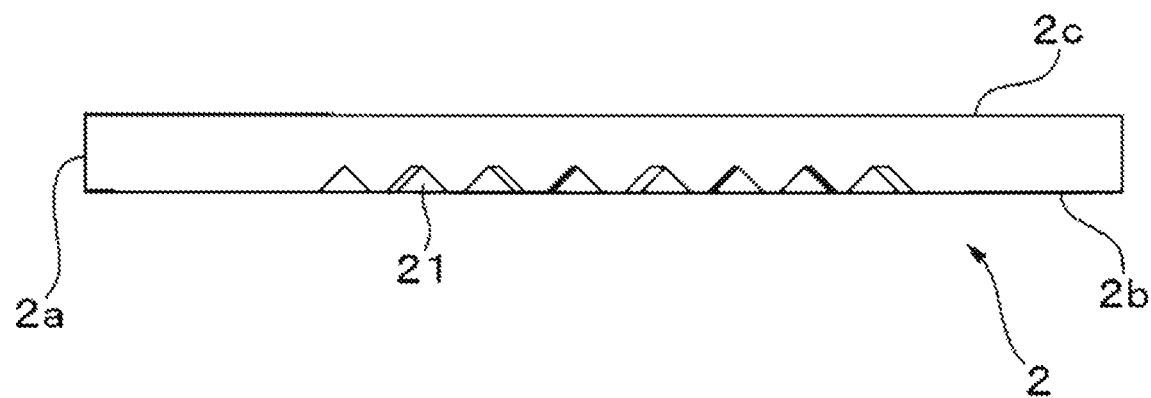
FIG. 3 is a schematic lateral cross-sectional view of the light guide plate along the line A-A' in FIG. 2.

FIG. 2 is a schematic front view of the light guide plate 2. FIG. 3 is a schematic lateral cross-sectional view of the light guide plate along the line A-A' in FIG. 2. As illustrated in FIG. 2 and FIG. 3, the input surface 2a is formed on one sidewall surface of the light guide plate 2 facing the light source 3. Light from the light source 3 enters the light guide plate 2 from the input surface 2a. The light propagates through the light guide plate 2 via either total internal reflection from the diffusion surface 2b and the output surface 2c, or by traveling straight through. This light is totally reflected by any of the plurality of prisms 21 formed on the diffusion surface 2b located on the rear surface of the light guide plate 2; the light then exits from the output surface 2c. The plurality of prisms 21 are distributed to coincide with the pattern 22 to produce the pattern 22. Consequently, while the light source 3 is illuminated an observer will be able to view illuminated pattern 22 at the front surface of the light guide plate 2. The sizes of the prisms 21, and the thickness of the light guide plate 2 are exaggerated in FIG. 2 and FIG. 3 for illustrative purposes.

Each of the prisms 21 may be formed in the diffusion surface 2b, for example, as a roughly triangular groove of a predetermined length. Each of the prisms 21 includes a reflection surface 21a that forms a predetermined angle with the diffusion surface 2b. This predetermined angle is established so that light from the light source 3 entering the light guide plate 2 is totally internally reflected and travels toward the output surface 2c; for instance, this angle may be 40° to 50° relative to the diffusion surface 2b. The predetermined length is long enough to allow the plurality of prisms to be distributed within the pattern 22; for instance, this predetermined length may be several to tens of micrometers.

Figure 4:
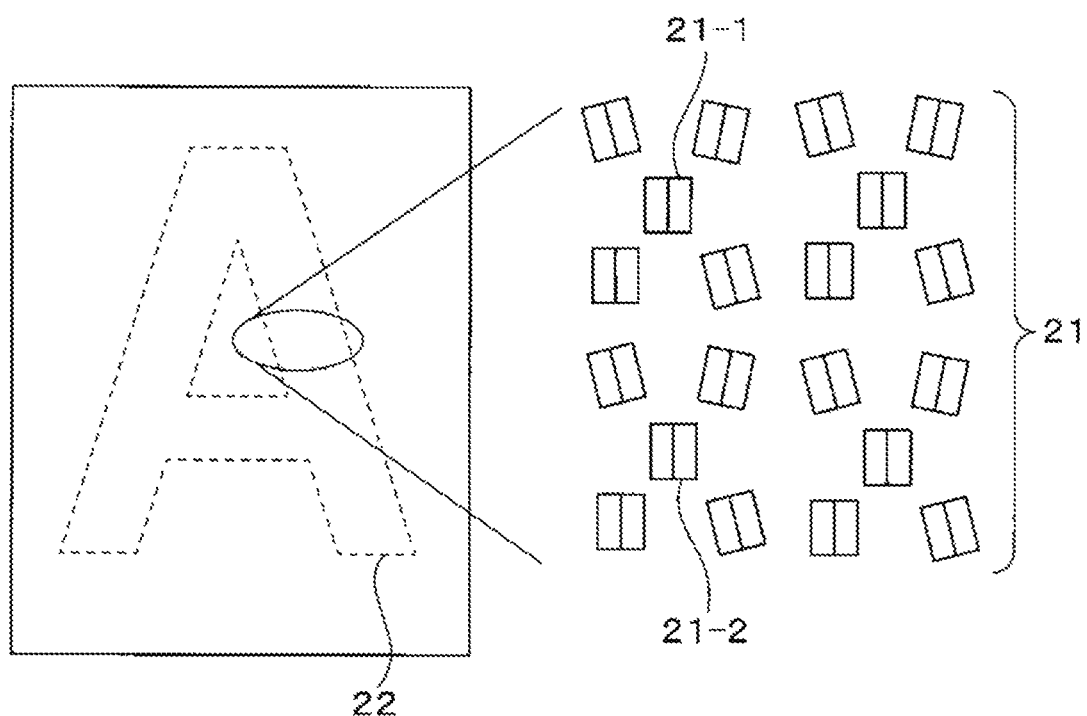
FIG. 4 is a partially exploded plan view of a pattern to illustrate the distribution of the prisms.

FIG. 4 is a partially exploded plan view of the pattern 22 to illustrate the distribution of the prisms 21. Each of the prisms 21 is distributed so that the reflection surfaces 21a have various orientations. In this embodiment, two adjacent prisms 21 can be distributed at an interval that is less than a predetermined pitch. The prisms 21 are arranged so that the reflection surfaces 21a of two prisms 21 separated at the predetermined pitch are oriented in the same direction, and the reflection surfaces 21a of two prisms closer than the predetermined pitch are oriented in different directions within a predetermined range of angles about a specific direction and in a plane parallel to the diffusion surface 2b. This specific direction may be, for instance, a direction where the reflection surface 21a directly faces the light source 3. The predetermined range of angles may be a range of angles that allow the light from the light source to reflect at the reflection surface 21a and exit from the output surface 2c; this range may be ±10°. The prisms may be arranged so that the difference in angle between the reflection surfaces 21a of the two adjacent prisms is between 4° to 6°, for example.

Additionally, the pitch between two prisms with reflection surfaces 21a that are identically oriented (e.g., the prism 21-1 and the prism 21-2, FIG. 4) is preferably less than the minimum distance perceivable by the observer.

For instance, assume that the minimum perceivable visual angle for the observer is equivalent to one arc minute, that is the visual angle for a person with normal visual acuity. Also assume that the observer and the light guide plate 2 are 60 cm apart. The pitch measured between two prisms with reflection surfaces 21a having the same orientation may be up to 0.17 mm. However, in this embodiment, all the observer sees is the emission of light from the prisms 21. Therefore, the observer cannot see each individual prism 21, even if the actual pitch between two prisms 21 with reflection surfaces 21a having the same orientation is slightly greater than the distance equivalent to the minimum visual angle perceivable by the observer. Therefore, it is sufficient to distribute the prisms 21 so that the pitch between two prism 21 with reflection surfaces 21a that are identically oriented is, for instance, a distance equivalent to an angle of 0.1° from the observer's gaze. If the observer and the light guide plate 2 are conceivably 60 cm apart, the pitch is no greater than 1 mm.

Thus, arranging the plurality of prisms 21 in this manner means that the prisms 21 reflect light from the light source 3 in different directions. Therefore, even if the pattern 22 were viewed from different directions the brightness observed would not change as much. The observer's eyes are also unable to detect the uneven brightness due to the different orientations of the reflection surfaces 21a of the prisms 21. Therefore, the pattern 22 may be presented to the observer as if it had an overall uniform brightness.

Figure 5:
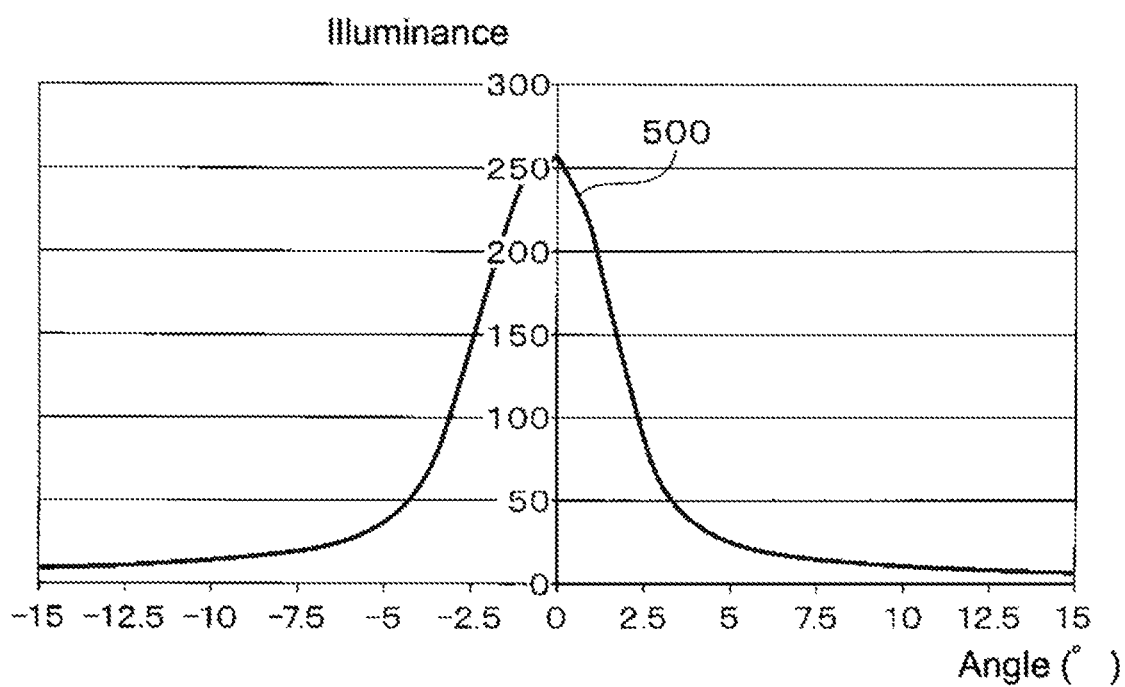
FIG. 5 depicts the results of simulating a brightness distribution for each angle when the reflection surfaces of the prisms are oriented in the same direction.

FIG. 5 depicts the results of simulating a brightness distribution for each angle when the reflection surfaces 21a of the prisms 21 are oriented in the same direction. In FIG. 5, the horizontal axis is a normal line from the output surface 2c, and represents the angle in a plane orthogonal to the input surface 2a. An angle of 0° corresponds to the direction of a normal line from the output surface 2c. The vertical axis represents the illuminance at an imagined observer. The graph 500 illustrates the relationship between the angle and the illuminance. As illustrated in the graph 500 when reflection surfaces 21a of all the prism 21 are identically oriented, the illuminance along the direction of a normal line from the output surface 2c is halved at around ±2.5°. This shows that the pattern 22 only appears bright at angles close to the direction along the normal line.

Figure 6:
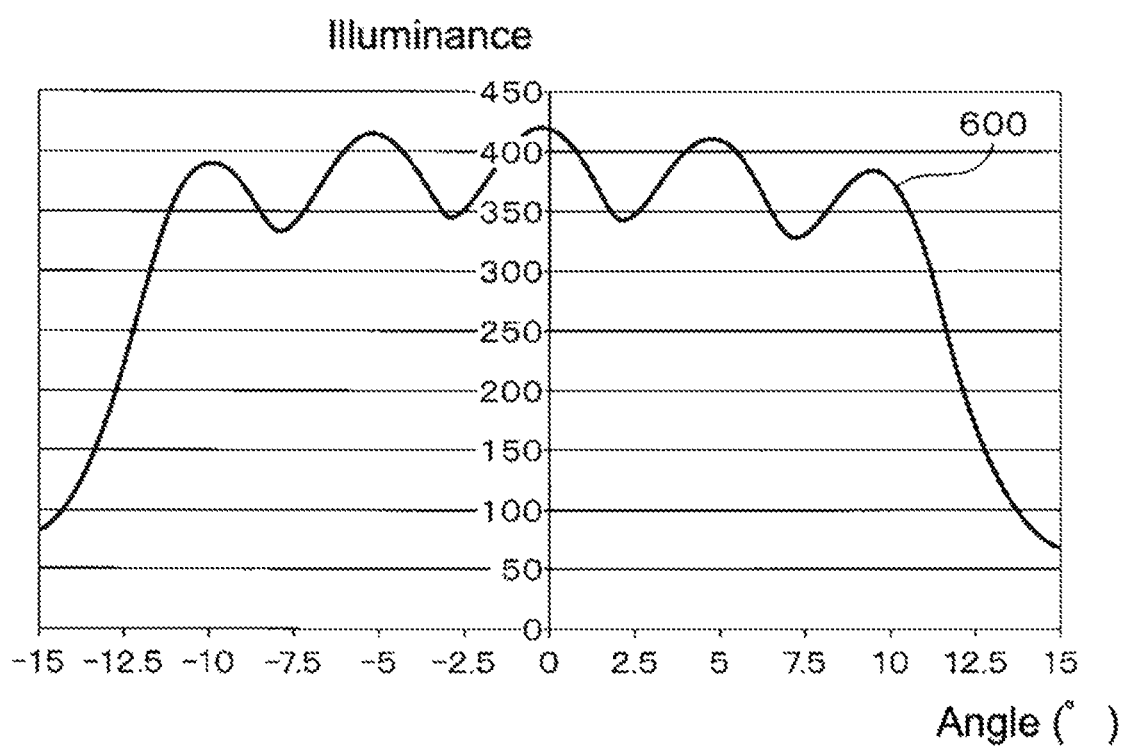
FIG. 6 depicts the results simulating a brightness distribution at 5° increments for each angle when the reflection surfaces of the prisms are at various orientations within ±10° of an orientation facing the light source.

FIG. 6 depicts the results of simulating a brightness distribution at 5° increments for each angle when the reflection surfaces 21a of the prisms 21 are at various orientations within ±10° of an orientation facing the light source. In FIG. 6, the horizontal axis is a normal line from the output surface 2c, and represents the angle in a plane orthogonal to the input surface 2a. An angle of 0° corresponds to the direction of a normal line from the output surface 2c. The vertical axis represents the illuminance at an imagined observer. The graph 600 illustrates the relationship between the angle and the illuminance. As illustrated by the graph 600, in this example, the illuminance within ±12.5° of the direction along the normal line from the output surface 2c is more than half the illuminance along the normal line. This shows that the pattern 22 appears bright over a much wider range of angles than when the reflection surfaces 21a are identically oriented.

As above described, among the plurality of prisms that create the pattern displayed on the light guide plate in the display device, the reflection surfaces of two prisms separated by a predetermined pitch are identically oriented; additionally the reflection surfaces of two prisms closer than the predetermined pitch are oriented in different directions. Hereby, light from the light source is reflected in and around a specific direction. Therefore, this reduces the unevenness of brightness that results because of the direction from which the pattern is viewed.

Next, a second embodiment of the display device is described. In contrast to the first embodiment, in this display device the directions from which the pattern appears bright is made to differ per section of the pattern. In order to do so, the reflection surfaces of the prisms within a particular section are given a certain orientation; this arrangement is made for each section of the pattern. Note that in the first embodiment and the second embodiment only the prisms forming the pattern are made to differ. The distribution of the prisms is described below. Other elements in the display device according to the second embodiment corresponding to elements in the display device of the first embodiment have been described therewith and thus it is sufficient to refer again to the first embodiment as needed.

Figure 7:
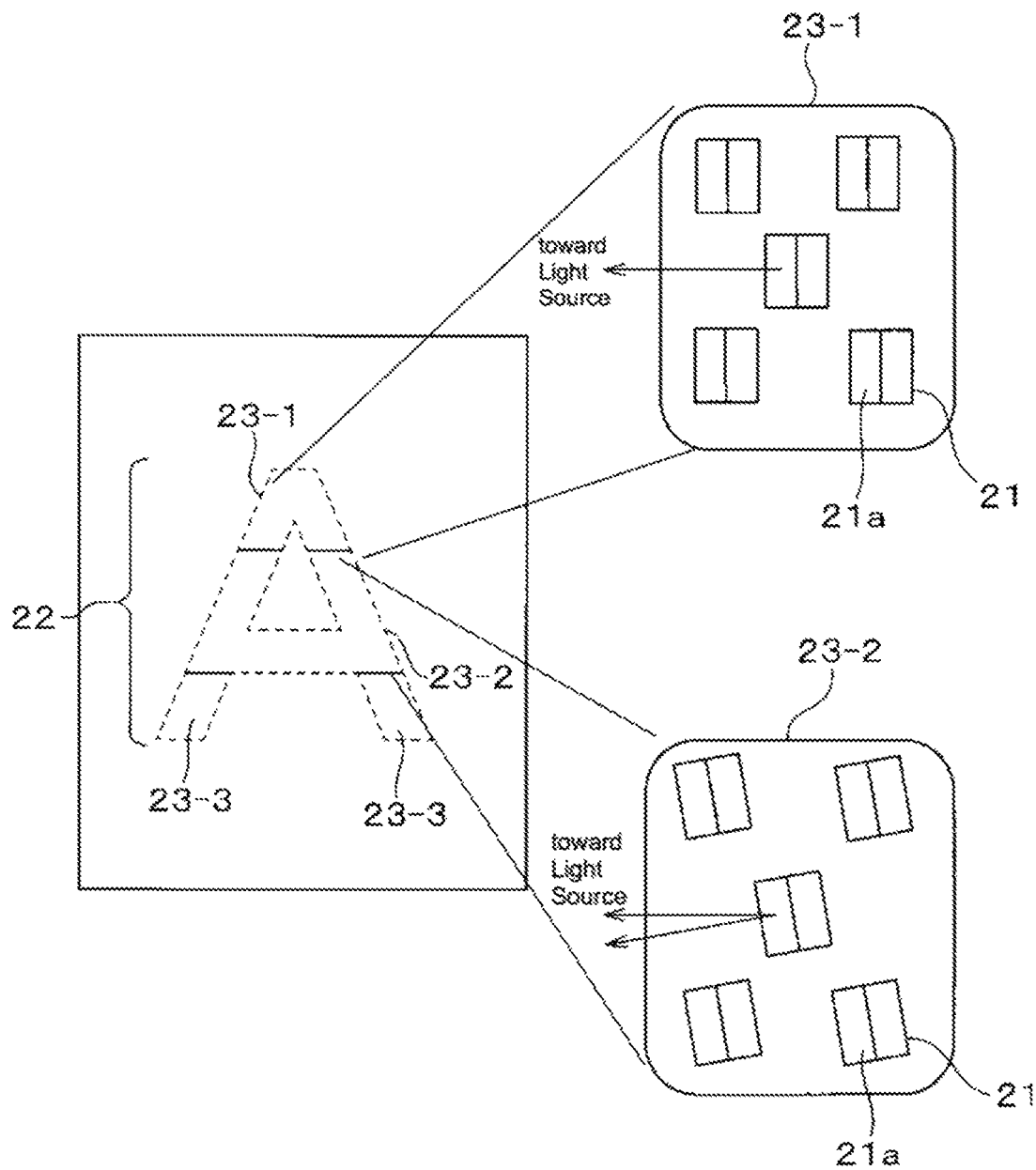
FIG. 7 is a partially exploded plan view of a pattern to illustrate the distribution of prisms according to a second embodiment.

FIG. 7 is a partially exploded plan view of a pattern 22 to illustrate the distribution of prisms 21 according to a second embodiment. In this modification example, the pattern 22 is partitioned into a plurality of sections 23-1 to 23-n (where n is an integer greater than two; in FIG. 7, n=3). The prisms 21 are arranged so that within each section 23-1 to 23-n the reflection surfaces 21a of the prisms 21 in a section are oriented in the same direction, whereas, the reflection surfaces 21a of the prisms 21 in two adjacent sections are oriented differently. For example, each of the prisms 21 included in the section 23-1 are distributed so that the reflection surfaces 21a are facing the light source 3. Therefore, the prisms 21 within the section 23-1 direct the light entering the light guide plate 2 from the light source 3 toward the direction of a normal line from the output surface 2c. In contrast, each of the prisms 21 included in the section 23-2 adjacent to the section 23-1 are arranged so that the reflection surfaces 21a thereof are inclined 10° from the direction of a normal line to the output surface 2c. Therefore, the prisms within the section 23-2 direct the light entering the light guide plate 2 from the light source 3 in a direction shifted from along the normal line to the output surface 2c by an angle corresponding to the incline of the reflection surface 21a relative to the direction facing the light source. As a result, when an observer views the light guide plate 2 from in front of the output surface 2c, the section 23-1 in the pattern 22 may appear relatively brighter, and the section 23-2 in the pattern 22 may appear relatively darker.

The sizes of the sections may be established so that the sections appear to be roughly of uniform brightness within the pattern 22, and preferably, so that a plurality of prisms 21 may be included. The sizes of the sections may differ; alternatively the sizes of each section may be the same. The orientations of the reflection surfaces 21a of the prisms 21 may be set to one of two predetermined directions for each section; alternatively, the orientations may be one of three predetermined directions.

A display device according to this embodiment establishes a different orientation for the reflection surface of each prism per section, to thereby create a brightness distribution within the pattern. Therefore, in this modification example the prisms within a section having a relatively low brightness may be of small size. This controls the complexity needed to machine the prisms within a section that has relatively low brightness. Given that in this embodiment there is no need to reduce the distribution density of prisms within a relatively darker section, it is possible to prevent flickering resulting from the difference in brightness between the portions with prisms and the portions without prisms.

Note that, in the display devices according to the above described embodiments and modification examples, when establishing different orientations for the reflection surfaces for two prisms instead of (or, in addition to) rotating the reflection surface 21a within a plane parallel to the diffusion surface 2b (i.e., about a normal line to the diffusion surface 2b or, the output surface 2c), the reflection surface 21a may have a different orientation based on the angle relative to the diffusion surface 2b. Here, if the angle of the reflection surface 21a relative to the diffusion surface 2b changes, the angle at which the light exits from the output surface 2c also changes. Therefore, the same effects may be obtained in a display device according to the above-described embodiments and modification examples.

In another modification to the above-described embodiments, a metal layer may be placed at only the locations on the diffusion surface 2b of the light guide plate 2 corresponding to the pattern created by the plurality of prisms. For instance, when the prisms are a depth of 5 µm to 50 µm from the diffusion surface 2b to the top of the prisms, this kind of metal layer may be created via sputtering, deposition, or plating after masking the other portions of the pattern. Here, the metal layer may be a thin film that is roughly 0.001 to 10 µm thick. Whereas, when the prisms are a depth of greater than 50 µm from the diffusion surface 2b to the top of the prisms, the metal layer may be created by adhering a metal decal on the diffusion surface 2b. The metal decal may be shaped as the pattern and adhered to the location for the pattern. Here, the metal layer may be no less than 10 µm thick, for example.

The metal layer may be thusly provided on the pattern portion; hereby, the display device may present a metallic pattern to an observer viewing the light guide plate 2 from the output surface 2c even if the light source is turned off. In addition, in this modification example turning on the light source 3 allows a metallic as well as lighted pattern to be presented to an observer viewing the light guide plate 2 from the output surface 2c in accordance with the color of the metal layer and the colors emitted from the light source 3.

A display device according to any of the above embodiments or modification examples may be mounted in a game machine such as pinball machine or a slot machine.

Figure 8:
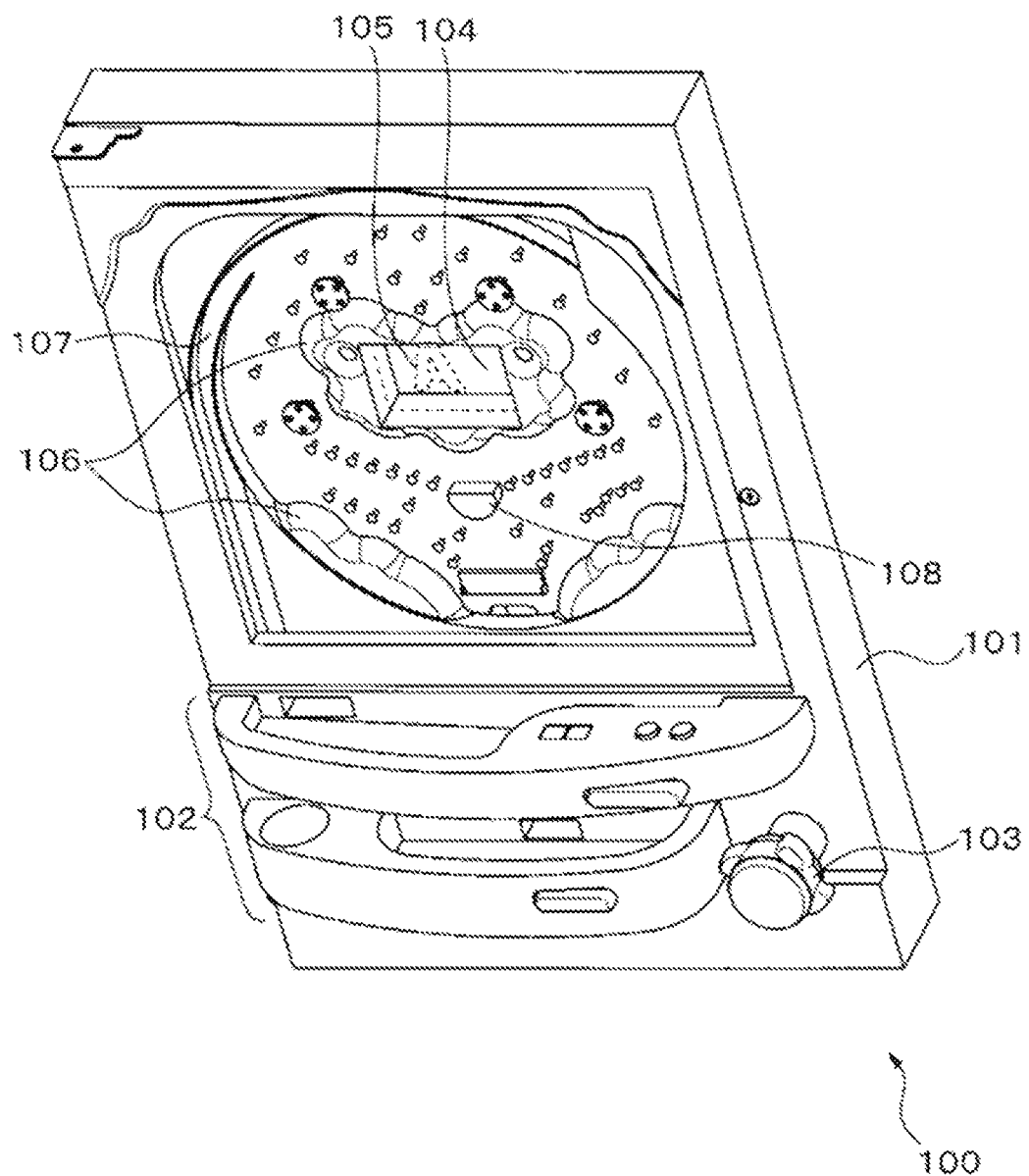
FIG. 8 is a schematic perspective view, i.e, a user view of pinball game machine including a display device according to the above embodiments or modification examples.

FIG. 8 is a schematic perspective view, i.e, a user view of a pinball game machine including a display device according to the above embodiments or modification examples. As illustrated in FIG. 8, a pinball machine 100 includes a playfield 101 which is the main game unit. The playfield 101 is where play takes place and takes up a majority of the machine, from the top portion to the center. The pinball machine 100 also includes a ball trough 102 arranged below the playfield 101, an operation portion 103 provided with a jog; a liquid crystal display provided at roughly the center of the playfield 101; and a display device 105 disposed on the front surface of the liquid crystal display 104.

To aid in presentation of the game, the pinball machine 100 includes accessories 106 arranged on the front surface of the playfield 101, at the lower part of the playfield 1601 and surrounding the display device 105. The playfield 101 includes rails 107 positioned at the sides. The playfield 101 may also include multiple obstacle pins (not shown) and at least one prize target 108.

The input unit 103 launches the pinball at a predetermined force via a launcher (not shown) in accordance with the amount of rotation of the jog by a player. A launched pinball travels upward along the rails 107 and falls between the multiple obstacle pins. When a sensor (not shown) detects that a pinball has entered any of the prize targets 108, a main controller (not shown) provided on the rear side of the playfield 101 pays out a predetermined number of pinballs depending on the prize into the ball trough 102 via a payout device (not shown). The main controller also drives the liquid crystal display 104 and the display device 105 via a CPU (not shown) provided on the rear side of the playfield 101.

The display device 105 is merely one example of a display device according to the above embodiments and modification examples; this display device 105 may be attached to the playfield 101 so that the output surface of the light guide plate is oriented toward the player. The controller in the display device 105 may illuminate the light source in accordance with a control signal from the game CPU in response to the state of play. As a result the player may be presented with a video on the liquid crystal display 104 while viewing a predetermined pattern. Alternatively, the controller may turn off the light source so that the observer may view only the video presented on the liquid crystal display 104 via the light guide plate.

A person having ordinary skill in the art may make various modifications in the above manner within the scope of the invention in accordance with how the device will be used.

REFERENCE NUMERALS

1 Display device
2 Light guide plate

2a Input surface
2b Diffusion surface
2c Output surface
3 Light source
21 Prism
21a Reflection surface
22 Pattern
23-1 to 23-n Pattern section
4 Controller
100 Pinball machine
101 Playfield
102 Ball trough
103 Operation portion
104 Liquid crystal display
105 Display device
106 Accessories
107 Rail
108 Prize target

The invention claimed is:

1. A light guide plate formed from a panel transparent to visible light, the light guide plate comprising:
   an input surface comprising a sidewall of the light guide plate, the input surface facing a light source that emits visible light that enters the light guide plate at the input surface; and
   a plurality of prisms arranged along one surface of the light guide plate and distributed in a predetermined pattern, each prism of the plurality of prisms comprising a reflection surface that reflects the visible light emitted from the light source, wherein
      each prism of the plurality of prisms is distributed so that the reflection surfaces of any two prisms separated by a predetermined pitch are oriented in a same direction, and
      the reflection surfaces of any two prisms that are separated by other than the predetermined pitch are oriented in mutually different directions such that the visible light emitted from the light source and reflected from the any two prisms separated by other than the predetermined pitch is reflected in mutually different directions.

2. The light guide plate according to claim 1, wherein each prism of the plurality of prisms is arranged so that the reflection surfaces of any two prisms that are separated by less than the predetermined pitch are oriented in mutually different directions within a plane parallel to the one surface in a predetermined range of angles that includes a direction facing the light source.

3. The light guide plate according to claim 1, wherein the predetermined pitch is less than a minimum distance required to visually distinguish two prisms out of the plurality of prisms.

4. The light guide plate according to claim 1, further comprising: a metal layer shaped in the predetermined pattern and provided at a location of the predetermined pattern on the one surface of the light guide plate.

5. A light guide plate formed from a panel transparent to visible light, the light guide plate comprising:
   an input surface comprising a sidewall of the light guide plate, the input surface facing a light source that emits visible light; and
   a plurality of prisms arranged along one surface of the light guide plate and distributed in a predetermined pattern, each prism of the plurality of prisms comprising a reflection surface that reflects the visible light emitted from the light source, wherein
      the predetermined pattern is partitioned into a plurality of sections with each prism of the plurality of prisms arranged so that the reflection surface of each prism in a section is oriented in a same direction, and the reflection surface of each prism of the prisms in two adjacent sections is oriented in mutually different directions such that the visible light emitted from the light source and reflected from the prisms in the two adjacent sections that are separated by other than a predetermined pitch is reflected in mutually different directions.

6. The light guide plate according to claim 5, further comprising: a metal layer shaped in the predetermined pattern and provided at a location of the predetermined pattern on the one surface of the light guide plate.

7. A display device comprising:
   a light source that emits visible light;
   a light guide plate formed from a panel transparent to visible light; and
   a controller configured to control turning on and off of the light source;
   the light guide plate comprising:
      an input surface facing the light source and comprising a sidewall of the light guide plate; and
      a plurality of prisms arranged along one surface of the light guide plate and distributed in a predetermined pattern, each prism of the plurality of prisms comprising a reflection surface that reflects the visible light emitted from the light source, wherein
   each prism of the plurality of prisms is distributed so that the reflection surfaces of any two prisms separated by a predetermined pitch are oriented in a same direction, and
   the reflection surfaces of two prisms that are separated by other than the predetermined pitch are oriented in mutually different directions such that the visible light emitted from the light source and reflected from the any two prisms that are separated by other than the predetermined pitch is reflected in mutually different directions.

8. A game machine comprising: a main game unit; and
   a display device provided on a surface of the main game unit facing a player;
   the display device comprising:
      a light source that emits visible light;
      a light guide plate formed from a panel transparent to visible light; and
      a controller configured to control turning on and off of the light source;
   the light guide plate comprising:
      an input surface facing the light source and comprising a sidewall of the light guide plate;
      a plurality of prisms arranged along one surface of the light guide plate and distributed in a predetermined pattern, each prism of the plurality of prisms comprising a reflection surface that reflects the visible light emitted from the light source; and wherein
   each prism of the plurality of prisms is distributed so that the reflection surfaces of any two prisms separated by a predetermined pitch are oriented in a same direction, and
   the reflection surfaces of two prisms that are separated by other than the predetermined pitch are oriented in mutually different directions such that the visible light emitted from the light source and reflected from the any two prisms that are separated by other than the predetermined pitch is reflected in mutually different directions.

* * * * *